(12) United States Patent
Schimbaeck et al.

(10) Patent No.: US 9,269,237 B2
(45) Date of Patent: Feb. 23, 2016

(54) APPARATUS AND METHOD FOR DETECTING A FOREIGN OBJECT MOUNTED IN THE NEAR RANGE OF AN INPUT MEANS USED FOR IDENTIFICATION AND/OR AUTHENTICATION, INPUT MEANS AND SERVICE MACHINE

(75) Inventors: Erwin Schimbaeck, Mauthausen (AT); Christian Lehner, Sankt Florian (AT)

(73) Assignee: KEBA AG (AT)

( * ) Notice: Subject to any disclaimer, the term of this patent is extended or adjusted under 35 U.S.C. 154(b) by 129 days.

(21) Appl. No.: 13/882,965

(22) PCT Filed: Oct. 17, 2011

(86) PCT No.: PCT/EP2011/068098
§ 371 (c)(1),
(2), (4) Date: May 1, 2013

(87) PCT Pub. No.: WO2012/059316
PCT Pub. Date: May 10, 2012

(65) Prior Publication Data
US 2013/0221989 A1 Aug. 29, 2013

(30) Foreign Application Priority Data
Nov. 4, 2010 (EP) .................................. 10190003

(51) Int. Cl.
*G07F 19/00* (2006.01)
*G01S 7/03* (2006.01)
(Continued)

(52) U.S. Cl.
CPC .............. *G07F 19/207* (2013.01); *G01S 7/036* (2013.01); *G01S 13/04* (2013.01); *G07F 19/2055* (2013.01); *G09B 23/28* (2013.01); *H01Q 1/2216* (2013.01); *H01Q 9/0435* (2013.01)

(58) Field of Classification Search
CPC ... G07F 19/207; G07F 19/2055; G07F 19/20; G01S 7/036; G01S 2007/356; G01S 13/04; G01S 13/36; G09B 23/28; H01Q 1/2216; H01Q 9/0435

USPC ................... 324/642; 342/118, 128, 194, 196
See application file for complete search history.

(56) References Cited

U.S. PATENT DOCUMENTS

| | | | | |
|---|---|---|---|---|
| 4,166,973 A | 9/1979 | Lilly, Jr. et al. | .......... | 324/58.5 B |
| 4,238,795 A * | 12/1980 | Schiek et al. | ................. | 342/127 |

(Continued)

FOREIGN PATENT DOCUMENTS

| | | | | |
|---|---|---|---|---|
| DE | 19739771 | 3/1999 | ................ | G07F 9/02 |
| DE | 102005030345 | 3/2006 | ................ | G01S 7/03 |

(Continued)

OTHER PUBLICATIONS

International Search Report issued in corresponding application No. PCT/EP2011/068098, dated Nov. 25, 2011 (6 pgs).

(Continued)

*Primary Examiner* — Tung X Nguyen
*Assistant Examiner* — David Frederiksen
(74) *Attorney, Agent, or Firm* — Hayes Soloway P.C.

(57) ABSTRACT

The apparatus for detecting a foreign object mounted in the near range of an input means used for identification and/or authentication includes at least a coupler. The coupler is arranged to supply an oscillating signal to two input terminals of an antenna for generating a standing wave, to supply the oscillating signal with a predetermined level to a detection device, and to couple out, for the detection device, a reflection signal received by the antenna. Furthermore, the coupler is arranged to detect a phase difference between the supplied oscillating signal with the predetermined level and the reflection signal that is coupled out, in order to detect the foreign object.

19 Claims, 3 Drawing Sheets

(51) Int. Cl.
*G01S 13/04* (2006.01)
*G09B 23/28* (2006.01)
*H01Q 1/22* (2006.01)
*H01Q 9/04* (2006.01)

(56) References Cited

U.S. PATENT DOCUMENTS

| | | | |
|---|---|---|---|
| 5,459,405 A | 10/1995 | Wolff et al. | 324/644 |
| 5,703,601 A * | 12/1997 | Nalbandian | H01Q 9/0428 343/700 MS |
| 6,315,194 B1 | 11/2001 | Graef et al. | 235/379 |
| 6,367,695 B1 | 4/2002 | Mair et al. | 235/380 |
| 6,390,367 B1 | 5/2002 | Doig | 235/436 |
| 6,587,072 B1 * | 7/2003 | Gresham et al. | 342/70 |
| 6,693,598 B1 | 2/2004 | Bishop et al. | 343/741 |
| 7,240,827 B2 | 7/2007 | Ramachandran et al. | 235/379 |
| 7,305,934 B2 | 12/2007 | Ishii | 118/723 MW |
| 7,379,013 B2 * | 5/2008 | Dean et al. | 342/27 |
| 7,479,921 B2 | 1/2009 | Iritani et al. | 342/118 |
| 7,598,903 B2 * | 10/2009 | Yang et al. | 342/85 |
| 7,798,395 B2 | 9/2010 | Ramachandran et al. | 235/379 |
| 2004/0026507 A1 | 2/2004 | Nagata et al. | 235/449 |
| 2004/0119966 A1 * | 6/2004 | Iritani | G01S 17/32 356/4.09 |
| 2006/0023571 A1 * | 2/2006 | Uebo et al. | 367/101 |
| 2006/0169764 A1 | 8/2006 | Ross et al. | 235/375 |
| 2006/0214842 A1 | 9/2006 | Takenoshita et al. | 342/175 |
| 2009/0251360 A1 * | 10/2009 | Uebo | G01S 13/32 342/129 |
| 2010/0231387 A1 * | 9/2010 | Hong et al. | 340/541 |

FOREIGN PATENT DOCUMENTS

| | | | |
|---|---|---|---|
| EP | 0015920 | 10/1980 | B07C 5/00 |
| EP | 0561124 | 9/1993 | G06K 17/00 |
| EP | 1844454 | 10/2007 | G07F 19/00 |
| RU | 2 232 423 | 7/2004 | G07F 7/08 |
| RU | 2006 101 691 | 6/2006 | G06G 1/00 |
| WO | WO 2005/001598 | 1/2005 | |

OTHER PUBLICATIONS

English translation of Decision of Grant issued in corresponding Russian Application No. 2013125515/08(037581) received on Apr. 1, 2015 (7 pgs).

Chinese Office Action issued in application No. 201180064195.0, dated Apr. 24, 2015 (24 pgs).

* cited by examiner

APPARATUS AND METHOD FOR DETECTING A FOREIGN OBJECT MOUNTED IN THE NEAR RANGE OF AN INPUT MEANS USED FOR IDENTIFICATION AND/OR AUTHENTICATION, INPUT MEANS AND SERVICE MACHINE

TECHNICAL FIELD

The technical field of the invention concerns the detection of a foreign object mounted in the near range of an input means used for authentication, in particular the detection of a foreign objected inserted into or mounted to a service machine for skimming identification and authorization information or for tampering with the service machine or devices interacting with the service machine, such as magnetic stripe cards.

RELATED ART

Such an attack for skimming or tampering with a service machine or a device interacting with the service machine for the purpose of unlawfully obtaining authorization information is also referred to as a skimming attack.

For example, in a skimming attack targeting a service machine, such as an automatic teller machine, the machine may be rigged by a third party by mounting an unauthorized or foreign reading device in the region of the card insert port of the automatic teller machine, which is recognized hardly or not at all as such by users of the automatic teller machine. By means of the reading device, the data stored on the card or magnetic stripe card, in particular magnetic stripe data, are read out unnoticed during the regular use of the machine and are sent to a device that is coupled with the reading device or buffered in the reading device in order to read them out at a later point in time after removal of the reading device from the machine. Furthermore, the personal identification number (PIN) of the card may be skimmed. For this, a camera is used to capture the keyboard entry of the PIN. The attacker may then use the skimmed information to manufacture and use a copy of the card and thus gain unauthorized access to accounts or to secured areas.

A skimming device may be located for example in the front part of the automatic teller machine, in an additional magnetic card reader, in the card insert port or in the card reading device. Examples for such foreign objects or skimming devices are magnetic heads, coils or microphones. Furthermore, keyboards for PIN entry may be covered by keyboard dummies, that are not recognizable as such and detect or record entry of a user's PIN unnoticed and unlawfully.

The publication EP 0 015 920 B1 describes a method for discerning the presence or absence of a microwave-reflecting component of an object, by which microwaves of a predetermined frequency are generated. For this, an output location of the microwaves is defined. Moreover, a distance range of this output location is given, which exceeds the wavelength of a standing wave of the microwave energy of the predetermined frequency and in which the microwave-reflecting component is introduced during the discerning process. Microwaves reflected by the component are received and their amplitude is determined. The standing wave of this microwave energy is deformed from its usual cyclic sinusoid curve of a characteristic from the output location into a curve that has a maximum value at the output location and a first minimum value that lies at the outer end, with respect to the output location, within the distance range, the first minimum value being a threshold, so that within said range this minimum value cannot lead to reflected values that are larger than the minimum value itself, and outside of said range, there are no values that exceed the threshold.

The publication U.S. Pat. No. 5,459,405 A discloses a method and an apparatus for detecting the presence of an object using near field effects.

The publication EP 0 561 124 B1 describes a device and a method for determining attempted frauds by connecting an electric wire to a terminal point of a chip card in an apparatus for reading and writing from/to a memory of a chip card.

The device includes a measurement device and a resonance unit having a resonator that is coupled to the terminal point, the electric characteristics of the resonator being variable by the unauthorized wire that is installed, those electric characteristics being detectable by the measurement device.

An example for the evaluation of sensor signal in a self-service terminal is described in the publication EP 1 844 454 A1.

The publication U.S. Pat. No. 7,479,921 B2 describes a distance measuring device. The distance measuring device includes a sending source having a VCO, a transmission unit, a detection unit and a signal processing unit.

Here, the distance measuring device is provided with a bidirectional coupler between the transmission unit and the sending source or the detection device. The output signal of the VCO is supplied to the transmission unit as well as to the detection device. Furthermore, the bidirectional coupler detects a reflected wave R, which has been received by means of the antenna of the transmission unit, and provides the detected reflected wave R to a multiplier and the detection device.

Moreover, a phase detection is carried out by multiplying the reflected wave R with a signal that is synchronized with the transmission signal.

U.S. Pat. No. 6,367,695 B1 describes a self-service terminal with an emitter/detector systern, wherein the emitter and the detector are arranged such that an illegitimately introduced object disturbs the emissions between emitter and detector, and thus the illegitimately introduced object can be detected. For this, microwaves are used, for example.

The publication US 2004/026507 A1 discloses an automatic teller machine with a detector for detecting illegitimately introduced foreign objects. Such an illegitimately introduced foreign object may be a magnetic head, for example. For example a microwave sensor is used as a detector.

A further conventional self-service terminal is disclosed in U.S. Pat. No. 6,390,367 A. A further automatic teller machine with the possibility of preventing fraud is disclosed in the publication U.S. Pat. No. 7,240,827 B2.

DISCLOSURE OF THE INVENTION

An object of the present invention is to provide a solution for the detection of a foreign object that is illegitimately mounted in the near range of an input means used for identification and/or authentication.

In particular, it is an object of the present invention to provide a solution for the detection of foreign objects or skimming devices, which are illegitimately mounted in a service machine and which are located in the near range of the input means for inputting identification and/or authorization information.

Accordingly, an apparatus for detecting a foreign object mounted in the near range of an input means used for identification and/or authentication is proposed, the apparatus including at least a coupler. The coupler is arranged to supply an oscillating signal to two input terminals of an antenna for generating a standing wave, to supply the oscillating signal phase-shifted and with a predetermined level to a detection device, and to couple out, for the detection device, a reflection signal that was received by the antenna. Furthermore, the coupler is arranged to detect a phase difference between the supplied oscillating signal with the predetermined level and the reflection signal that is coupled out in order to detect the foreign object.

The antenna is configured as a circularly polarized patch antenna with emission characteristics that are, within a tolerance, in particular substantially, constant or homogenous within a monitoring range of the apparatus. In order to attain the constant emission characteristics, the aperture angle of the antenna may be arranged such that it covers the entire detection region of the apparatus.

By configuring the antenna as a circularly polarized antenna, a high, directionindependent sensitivity is attained within the entire detection region of the apparatus. Furthermore, the antenna is preferably configured to be transparent for the entire usable frequency region of the ISM band.

The apparatus may also be referred to as an anti-skimming apparatus, as a standing wave sensor apparatus or as a standing wave sensor.

The apparatus is suitable for input means that are arranged to identify and authenticate users. However, the apparatus is also suitable for input means that are arranged to identify or authenticate users.

The apparatus is particularly suitable to monitor input means of authentication systems and/or identification systems with regard to tampering. The input means may be arranged such that a user can input an entry for identifying or authenticating the user. Examples for input means are keyboards, in particular PIN keyboards, iris scanners, finger scanners or the like. Moreover, such an identification system may be part of a service machine.

Furthermore, input means are proposed, which include at least one structurally integrated apparatus for detecting a foreign object mounted in the near range of an input means of an identification system or authentication system as described above.

Moreover, a service machine is proposed, which includes at least one apparatus for detecting a foreign object mounted in the near range of an input means of the service machine as described above.

Furthermore, a method for detecting a foreign object mounted in the near range of an input means used for identification and/or authentication is proposed, having the following steps:

supplying an oscillating signal to the two input terminals of an antenna for generating a standing wave, wherein the antenna is configured as a circularly polarized patch antenna with emission characteristics that are constant, within a tolerance, in a monitoring range of the apparatus, supplying the oscillating signal with a predetermined level to a detection device, coupling out, to the detection device, a reflection signal received by the antenna, and detecting, with the detection device, a phase difference between the supplied oscillating signal with the predetermined level and the reflection signal that is coupled out, in order to detect the foreign object.

Furthermore, a computer program product is proposed, which causes on a program-controlled device the execution of at least a part of the above-described method for detecting a foreign object mounted in the near range of an input means used for identification and/or authentication. The at least one part, which is embodied as a computer program product, includes in particular the step of detecting the phase difference between the supplied oscillating signal with the predetermined level and the reflection signal that is coupled out.

A computer program product, such as a computer program means, may be provided or furnished as a storage medium, such as a memory card, a USB stick, a floppy disk, a CD-ROM, a DVD, but also in form of a downloadable file from a server in a network. This may occur for example in a wireless communication network by transferring a corresponding file with the computer program product or the computer program means.

The apparatus may be arranged to generate an electromagnetic field by means of a standing wave in the near range of the apparatus, and to detect a change of the generated electromagnetic field due to a reflection at an electromagnetically reactive material of a foreign object that is illegitimately mounted in or at a part of the service machine, in particular of a skimming device.

Thus, additionally mounted reader or scanner devices can be recognized. These reader or scanner devices do not necessarily have to be introduced into the machine, but may also be mounted or arranged outside.

By employing a standing wave, the apparatus is able to detect foreign or other objects in the near range of the antenna of the apparatus. The apparatus may operate, in particular, in the microwave region. Operating frequencies of for example 5.8 GHz within the ISM band (ISM band: industrial, scientific and medical band) may be used.

By introducing or removing electromagnetically reactive materials into the near field of the antenna of the apparatus, the antenna is put out of tune and its impedance at the set transmission frequency is changed. This changes the reflected portion of the signal, in particular its amplitude or level, at the corresponding output of the coupler. In particular, foreign objects that are mounted additionally with fraudulent intent, such as tampering devices or skimming devices, can thus be sensed.

In accordance with the present invention, a part of the service machine to be monitored is any part of the service machine that is a potential target for an attack by fraudulent tampering in order to illegitimately skim security data, in particular authorization data. Such parts or machine parts are, in particular, the region of a card reader for guiding a magnetic card or a PIN pad for entering a PIN code.

Depending on the predetermined phase difference, a result signal for detecting a foreign object introduced into the service machine may be provided. This result signal may be digitized in particular with an AD-converter and supplied to an evaluation unit that is disposed downstream.

The evaluation unit may carry out, in particular, an evaluation and consistency check of the result signal or the result signals, a filtering and a correction in order to compensate changes that are not caused by tampering, in particular phase differences due to changes of varying environmental conditions, in particular temperature and humidity. Moreover, the evaluation unit filters out short-term signal changes during permissible actions and operations at the service machine, such as withdrawing cash or the like.

The evaluation unit may be configured as a self-contained module with its own processing unit, for example. But the evaluation unit may also be integrated as a software module into the machine control of the service machine.

Advantageous embodiments and modifications of the invention are apparent from the dependent claims as well as the description with reference to the drawings.

According to a preferable embodiment, the coupler is configured as a directional coupler.

According to a further preferable embodiment, the detection device is configured as a demodulator, in particular as an envelope demodulator. In that case, the detection device is provided with a sum signal and then detects an amplitude or amplitude change thereof. The influence of the phase difference already occurs in the coupler when generating the sum signal.

According to a further preferable embodiment, an oscillator for providing the oscillating signal is provided, the oscillator being coupled to the coupler.

For example, the oscillator may generate a non-modulated carrier signal as an oscillating signal, which has a constant level within the used frequency region. Preferably, this generated non-modulated carrier signal undergoes only small changes due to temperature variations. The oscillator is preferably frequencystabilized within the used frequency region.

Furthermore, the oscillator is preferably tunable and/or can be calibrated. Thus, it is possible to perform individual tuning for optimum sensitivity of the apparatus in order to compensate individual variations among the circuit boards or the used components.

Moreover, it is preferable to employ a transceiver device. Such a transceiver device can be frequency stabilized in particular by a quartz and an internal phaselocked loop (PLL) and delivers a constant output level of, for example, up to +21 dBm. The output level varies with frequency and temperature by maximally 3 dB. The output level may be adjustable. As noted above, the transceiver operates preferably in the 5.8 GHz ISM band (5.725 GHz to 5.875 GHz). Within this frequency band, preferably several different frequencies can be set, in particular by means of internal registers.

The operating region of the apparatus depends in particular from the used frequency f and the distance of the objects.

The wavelength $\lambda$ at a frequency of 5.8 GHz is 51.72 mm in air (see the following equation):

$$\lambda = \frac{c}{f} = \frac{3 \cdot 10^8 \frac{m}{s}}{5.8 \cdot 10^9 \text{ Hz}} = 51.72 \text{ mm}$$

According to a further preferred embodiment, the coupler is adapted to shift a phase of the oscillating signal that is supplied to the first input terminal and/or the second input terminal of the antenna by a predetermined phase angle, in particular by a phase angle of 90°.

In particular, the oscillating signal may be divided evenly onto the two input terminals of the antenna with 0° and 90° phase shift in order to generate the standing wave. For example, the oscillator signal that is supplied to the input terminal of the directional coupler may be provided at the two output terminals for feeding the antenna, the two antenna feeding signals being phase shifted electrically by a phase angle of 90°.

The purpose of the electrically phase-shifted feeding and the geometrically rotated feeding is, in particular, the circular polarization of the antenna or the generated electromagnetic field, with which a higher detection sensitivity is attained regardless of the orientation of the foreign object.

According to a further preferable embodiment, the coupler is arranged to adjust the attenuation of the oscillating signal for the detection device in such a manner that the level of the oscillating signal supplied to the detection device corresponds within a tolerance, and in particular corresponds substantially, to the level of the reflection signal received by the antenna. An advantage of this embodiment lies in a maximization of the sensitivity.

With regard to a high sensitivity of the apparatus, it is particularly advantageous if the oscillating signal and the reflection signal, that is, the signal reflected at the foreign object, have substantially the same level or amplitude at the detection device, in particular across the entire frequency range of the used ISM band. This may be achieved in particular by a corresponding design of the coupler, in particular the directional coupler, as well as knowledge of the reflection characteristics of the foreign objects to be detected. If the configurations of the foreign objects used as skimming devices or tampering devices are known, then also their reflection characteristics are, at least substantially, known in advance.

According to a further preferable embodiment, the coupler is arranged to set the level of the oscillating signal for the detection device in dependence of the expected dimensions of the foreign object, in particular of a skimming device.

According to a further preferable embodiment, the coupler is arranged to set the attenuation of the oscillating signal for the detection device to a value between 2 dB and 8 dB. In particular, the coupler may set the attenuation of the oscillating signal for the detection device to 5 dB.

Thus, the attenuation by the coupler, in particular directional coupler, of the oscillating signal that is supplied to the detection device, in particular the demodulator, is considerably lower than in conventional directional couplers.

According to a further preferable embodiment, the coupler is impedance matched at its input terminals to the oscillator, the antenna and the detection device, in order to reduce reflections.

According to a further preferable embodiment, the patch antenna is formed on a substrate with a high relative dielectricity. In particular, the relative dielectricity of the substrate may be greater than 6 (er>6). The substrate may be a ceramic substrate, for example.

In order to manufacture the patch antenna, a circuit board material with high relative dielectricity is preferably used, in order to attain particularly compact dimensions. The resonance frequency of the antenna is preferably adjusted to the operating frequency, so that a maximum radiation is attained at that frequency. The impedance of the antenna input terminals is preferably adjusted at the operation frequency to the directional coupler in such a manner that signal reflection is low or minimal.

According to a further preferable embodiment, the detection device is arranged to multiply a superposition between the supplied oscillating signal having the predetermined level and the reflection signal that is coupled out with a characteristic curve of a non-linear element. The phase difference between the provided oscillating signal with the predetermined signal and the reflection signal that is coupled out can be detected in dependence thereof.

According to a further preferable embodiment, the non-linear element is a detector diode. The detection of the phase difference or the demodulation is carried out preferably at the detector diode, which converts the reception signal into the base band.

According to a further preferable embodiment, a lowpass filter is provided downstream of the detection device.

The lowpass filter provided downstream has the function to eliminate mixing products, in particular at double the frequency. In order to minimize the influence of temperature on the demodulation, variations in the diode characteristics of the detector diode are preferably compensated with a diode that is of identical configuration and thermally sufficiently coupled, and by subtraction at an instrumentation amplifier.

According to a further preferable embodiment, the coupler is arranged to detect foreign objects, in particular skimming devices, that are small in relation to the dimensions of the part of the service machine that is to be monitored.

Skimming devices such as audio heads or antenna coils are small in relation to the region of the service machine that is to be monitored, such as the card insert port.

According to a further preferable embodiment, the frequency of the oscillating signal and the geometry of the antenna are arranged such that the monitoring region of the apparatus is in a region where the reception sensitivity of the antenna is large.

If the oscillator frequency and thus the wavelength is varied over time within a predefined region, then the inherently present zones with low detection sensitivity can be shifted spatially. Thus, the overall attainable detection probability can be increased.

The invention is explained in the following in more detail with reference to the working examples shown in the diagrammatic figures.

In all figures, the same or functionally the same means and devices are denoted by the same reference symbols, unless noted otherwise.

Figure 1:
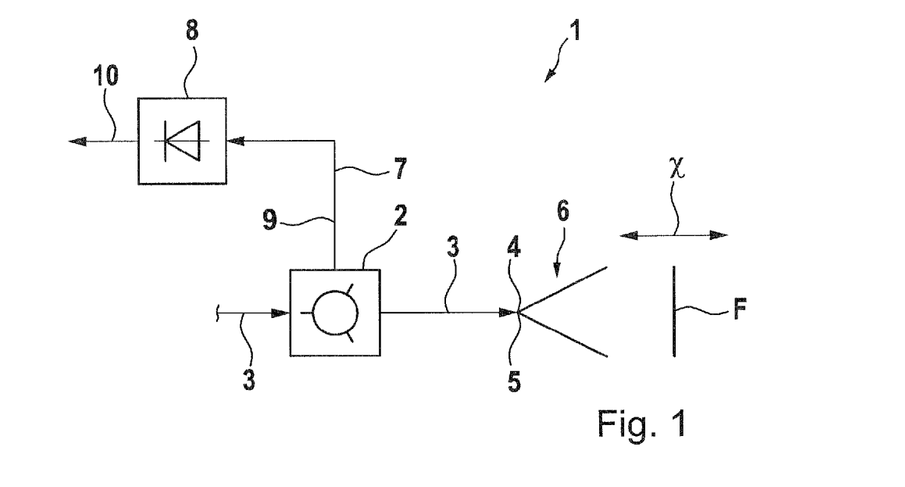
FIG. 1 shows a schematic block diagram of a first working example of an apparatus for monitoring at least a part of a service machine.

FIG. 1 shows a schematic block diagram of a first working example of an apparatus 1 for monitoring at least a part of a service machine. The apparatus 1 may be disposed in the card insert port of a service machine, for example.

The apparatus 1 includes a coupler 2, which is arranged to guide an oscillating signal 3 to the input terminals 4 and 5 of an antenna 6, in order to generate a standing, circularly polarized wave. Thus, a foreign object F that is arranged or introduced without permission into the service machine is detected. In FIG. 1, the distance between the antenna 6 of the apparatus 1 and the foreign object F is denoted as X.

The coupler 2 may be configured in particular as a directional coupler. The directional coupler 2 is configured to shift a phase of the oscillating signal 3 that is supplied to the first input terminal 4 and/or the second input terminal 5 of the antenna 6 by a predetermined phase angle, for example by 90°. The oscillating signal is divided evenly onto the two input terminals 4, 5 of the antenna 6 with a phase shift of 0° and 90°, in order to generate a standing, circularly polarized wave.

Furthermore, the directional coupler 2 supplies the oscillating signal 7 with a predetermined level to a demodulator 8.

The directional coupler 2 adjusts an attenuation of the oscillating signal 7 for the demodulator 8 such that the level of the oscillating signal 7 supplied to the demodulator 8 corresponds, within a tolerance, to the level of the reflection signal 9 received through the antenna 6. The level of the oscillating signal 7 for the demodulator 8 is adjusted in particular in view of the expected dimensions of the foreign object F. For example, the attenuation of the oscillating signal 7 for the demodulator 8 may be adjusted to a value between 2 dB and 8 dB, preferably to 5 dB.

The directional coupler 2 is arranged to detect a phase difference between the supplied oscillating signal 7 with the predetermined level and the reflection signal 9 that is coupled out to detect the foreign object F. Moreover, the demodulator 8 may be arranged in particular to multiply a superposition of the provided oscillating signal 7 having the predetermined level and the reflection signal 9 that is coupled out with a characteristic curve of a non-linear element, and to provide on its output side a signal indicating the phase difference 10 in dependence thereof. Moreover, the signal for indicating the phase difference 10 is suitable to provide a result signal for detecting the foreign object to a downstream evaluation unit.

The antenna 6 may be configured as a circularly polarized patch antenna, for example. The patch antenna 6 may be printed for example on a ceramic substrate 13 having a high relative dielectricity or high dielectric constant (see FIG. 5). The relative dielectricity of the ceramic substrate 13 is preferably greater than 6 ($\epsilon_r > 6$).

Figure 3:
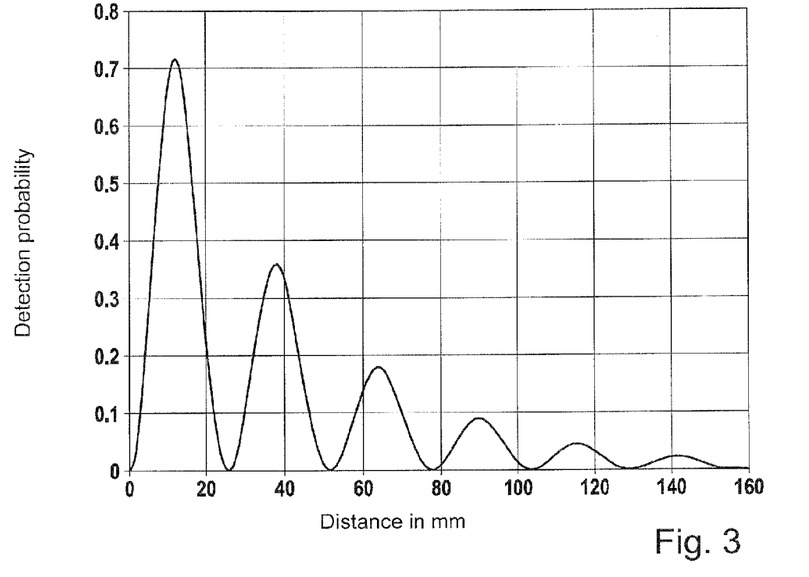
FIG. 3 shows a diagram illustrating the detection probability, that is, the detection sensitivity, of the apparatus as a function of the distance of a skimming device to the apparatus at a predetermined operating frequency.

The frequency of the oscillating signal 3 and the geometry of the antenna 6 may be arranged in particular such that the monitoring region of the apparatus 1 is in a region of high reception sensitivity of the antenna 6. Concerning this, FIG. 3 shows a diagram illustrating the detection probability of the apparatus 1 as a function of the distance of a skimming device to the apparatus 1.

Figure 2:
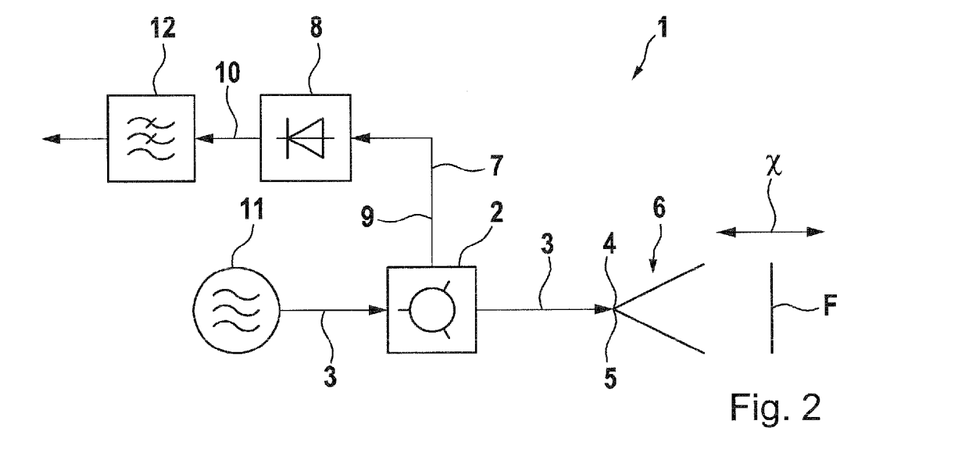
FIG. 2 shows a schematic block diagram of a second working example of an apparatus for monitoring at least a part of a service machine.

FIG. 2 shows a schematic block diagram of a second working example of the apparatus 1 for monitoring at least a part of a service machine. The apparatus 1 in FIG. 2 includes all features of the apparatus 1 in FIG. 1. In order to avoid repetitions, these common features are not explained again. Furthermore, the apparatus 1 includes an oscillator 11 and a lowpass filter 12. The oscillator 11 is coupled to the directional coupler 2 and provides the oscillating signal 3. The lowpass filter 12 is arranged downstream of the demodulator 8.

Figure 4:
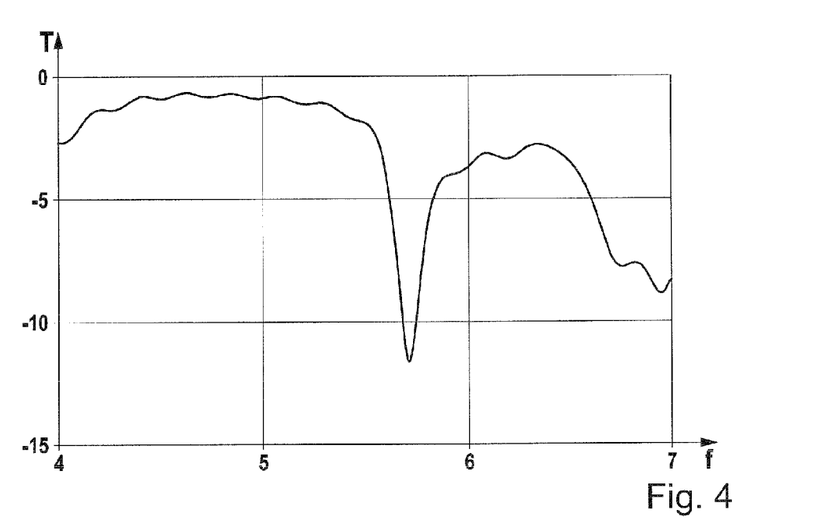
FIG. 4 shows a magnitude plot of the transfer function of a working example of a hybrid as directional coupler, from the oscillator input terminal to the demodulator with the antenna connected.

Referring to FIG. 2, FIG. 4 shows a magnitude plot of the transfer function of a working example of a hybrid as the directional coupler 2 from the oscillator input terminal of the oscillator 11 to the demodulator output of the demodulator 8 with the antenna 6. The x-axis in FIG. 4 marks the frequency f and the y-axis marks the magnitude plot of the transfer function T. Accordingly, the directional coupler 2 is realized as a 90°-Hybrid, that is slightly off-resonance in the frequency domain, in order to attain the transfer function shown in FIG. 4 between the oscillator input terminal of the oscillator 11 and the demodulator output terminal of the demodulator 8 of the hybrid. The electric length of each branch of the hybrid is A14. The minimum of the magnitude plot of the transfer function is below the actual operating region of, for example, 5.725 GHz to 5.875 GHz. In the example in FIG. 4, the minimum is about 5.6 GHz. For a high sensitivity, it is particularly advantageous, if the level of the signal at the demodulator output terminal of the hybrid is held as constant as possible within the used frequency region and has a higher level at the demodulator output terminal than a conventional 90°-Hybrid.

Figure 5:
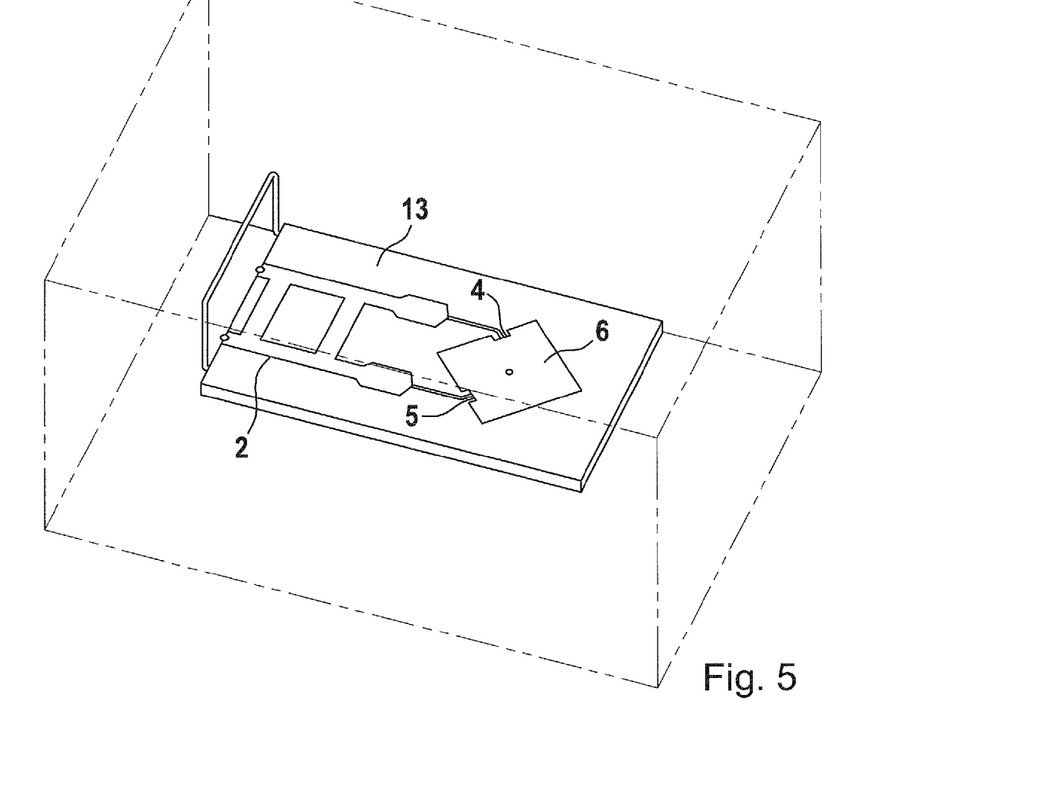
FIG. 5 shows a schematic view of a working example concerning the geometry of the directional coupler and the patch antenna of the apparatus.

FIG. 5 shows a schematic view of a working example concerning the geometry of the directional coupler 2 and the patch antenna 6. The directional coupler 2 and the patch antenna 6 are printed onto a ceramic substrate 13 with relatively high relative dielectricity. The high relative dielectricity ensures in particular correspondingly small dimensions of the patch antenna 6, and thus a compact overall size. The circular polarization of the patch antenna 6 is achieved by feeding the 90° phase-shifted signal to both sides of the patch (comp. FIGS. 1 and 2, reference numerals 4 and 5.

Figure 6:
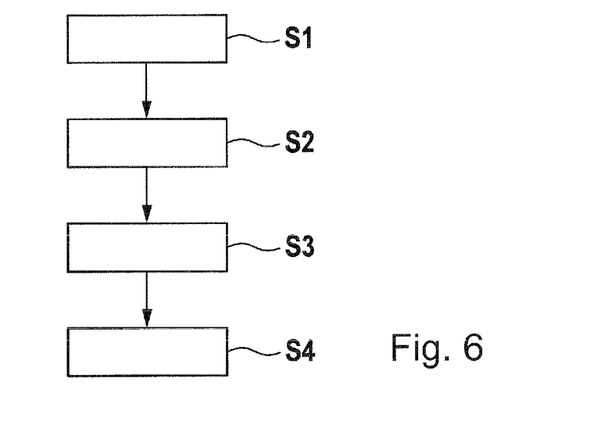
FIG. 6 shows a schematic flowchart of a working example of a method for detecting a foreign object mounted in a near range of an input means used for authentication.

FIG. 6 shows a schematic flowchart of a working example of a method for detecting a foreign object mounted in a near range of an input means used for authentication.

In Step S1, an oscillating signal is supplied to the two input terminals of an antenna to generate a standing, circularly polarized wave.

In Step S2, the oscillating signal is supplied with a predetermined level, in particular with an attenuated level, to a detection device.

In Step S3, a reflection signal received with the antenna is coupled out to the detection device. The reflection signal results preferably from a reflection of the standing wave at the foreign object.

In Step S4, a phase difference between the supplied oscillating signal having the predetermined level and the reflection signal that is coupled out is detected, in order to detect the foreign object.

Although the present invention has been described in the foregoing with reference to preferred working examples, it is not limited to this, but can be modified in many ways.

LIST OF REFERENCE NUMERALS 1 apparatus
2 coupler, in particular directional coupler
3 oscillating signal, in particular oscillator signal
4 input terminal
5 input terminal
6 antenna
7 oscillating signal with predetermined level
8 detection device, in particular demodulator
9 reflection signal
10 signal for indicating the phase difference
11 oscillator
12 lowpass filter
13 ceramic substrate
F foreign body
S1-S4 method step
X distance

What is claimed is:

1. An apparatus for detecting a foreign object mounted in the near range of an input device used for identification and/or authentication, comprising:
   a coupler that is arranged to supply an oscillating signal to two input terminals of an antenna for generating a standing wave by the antenna, to supply the oscillating signal with a predetermined level to a detection device and to couple out, for the detection device, a reflection signal received by the antenna, and
   to detect a phase difference between the supplied oscillating signal with the predetermined level and the reflection signal that is coupled out, in order to detect the foreign object,
   wherein the antenna is configured as a circularly polarized patch antenna with emission characteristics that are constant, within a tolerance, in a monitoring range of the apparatus.

2. The apparatus according to claim 1, wherein
an oscillator for providing the oscillating signal is provided, the oscillator being coupled with the coupler.

3. The apparatus according to claim 2, wherein
the oscillator is tunable.

4. The apparatus according to claim 2, wherein
in order to reduce reflections, the coupler is impedance matched at its input terminals to the oscillator, the antenna and the detection device.

5. The apparatus according to claim 1, wherein,
the coupler is adapted to shift a phase of the oscillating signal that is supplied to the first input terminal and/or the second input terminal of the antenna by a predetermined phase angle, in particular by a phase angle of 90°.

6. The apparatus according to claim 1, wherein
the coupler is arranged to adjust the attenuation of the oscillating signal for the detectior device in such a manner that the level of the oscillating signal supplied to the detection device corresponds, within a tolerance, to the level of the reflection signal received by the antenna.

7. The apparatus according to claim 6, wherein
the coupler is arranged to set the level of the oscillating signal for the detection device in dependence of expected dimensions of the foreign object, in particular of a skimming device.

8. The apparatus according to claim 1, wherein
the coupler is arranged to set the attenuation of the oscillating signal for the detection device to a value between 2 dB and 8 dB, preferably to 5 dB.

9. The apparatus according to claim 1, wherein the patch antenna is formed on a substrate with a relative dielectricity greater than 6 ($\in_r > 6$).

10. The apparatus according to claim 1, wherein
the detection device is arranged to multiply a superposition between the supplied oscillating signal having the predetermined level and the reflection signal that is coupled out with a characteristic curve of a non-linear element, and to determine the phase difference in dependence thereof.

11. The apparatus according to claim 1, wherein
the coupler is arranged to detect foreign objects, in particular skimming devices, that are small in relation to the dimensions of the part of the service machine that is to be monitored.

12. The apparatus according to claim 1, wherein
the frequency of the oscillating signal and the geometry of the antenna are arranged such that the monitoring region of the apparatus is in a region where the reception sensitivity of the antenna is large.

13. An input device comprising at least one structurally integrated apparatus according to claim 1 for detecting a foreign object mounted in the near range of the input device of an identification system or authentication system.

14. A service machine comprising at least one apparatus according to claim 1 for detecting a foreign object mounted in the near range of an input device of the service machine.

15. The apparatus according to claim 1, wherein the emission characteristics further comprise radiation pattern emission characteristics.

16. The apparatus according to claim 1, wherein the circularly polarized patch antenna is printed onto a substrate.

17. The apparatus according to claim 16, wherein the circularly polarized patch antenna is printed onto a ceramic substrate with a relative dielectricity greater than 6 ($\in_r > 6$).

18. The apparatus according to claim 1, wherein the oscillating signal is divided evenly into the two input terminals of the antenna with 0° and 90° phase shift to generate the standing wave.

19. A method for detecting a foreign object mounted in the near range of an input device used for identification and/or authentication, comprising the steps:
- supplying an oscillating signal to the two input terminals of an antenna for generating a standing wave by the antenna, wherein the antenna is configured as a circularly polarized patch antenna with emission characteristics that are constant, within a tolerance, in a monitoring range of the apparatus;
- supplying the oscillating signal with a predetermined level to a detection device,
- coupling out, to the detection device, a reflection signal received by the antenna, and
- detecting, with the detection device, a phase difference between the supplied oscillating signal with the predetermined level and the reflection signal that is coupled out, in order to detect the foreign object.

* * * * *